(12) United States Patent
Saxena et al.

(10) Patent No.: US 12,563,093 B1
(45) Date of Patent: Feb. 24, 2026

(54) DETECTION OF IMAGE INJECTION ATTACKS IN MOBILE DOCUMENT CAPTURE SYSTEMS USING ACCELEROMETER-BASED VIBRATION ANALYSIS

(71) Applicant: Socure, Inc., Incline Village, NV (US)

(72) Inventors: Deepanker Saxena, Incline Village, NV (US); Feng Xiao, Incline Village, NV (US); Boris Mezhibovskiy, Incline Village, NV (US); Che-Bin Liu, Incline Village, NV (US); Stefano Vegnaduzzo, Incline Village, NV (US); Pablo Ysrrael Abreau, Incline Village, NV (US)

(73) Assignee: Socure, Inc., Incline Village, NV (US)

( * ) Notice: Subject to any disclaimer, the term of this patent is extended or adjusted under 35 U.S.C. 154(b) by 0 days.

(21) Appl. No.: 19/242,417

(22) Filed: Jun. 18, 2025

(51) Int. Cl.
*H04L 9/40* (2022.01)
*G06F 3/01* (2006.01)

(52) U.S. Cl.
CPC .......... *H04L 63/1466* (2013.01); *G06F 3/016* (2013.01)

(58) Field of Classification Search
CPC ............................ H04L 63/1466; G06F 3/016
See application file for complete search history.

(56) References Cited

U.S. PATENT DOCUMENTS

| | | | |
|---|---|---|---|
| 2015/0298169 A1* | 10/2015 | VanBlon | G06F 3/0304 |
| | | | 367/138 |
| 2018/0099640 A1* | 4/2018 | Ludger | G07C 9/00309 |
| 2020/0311235 A1* | 10/2020 | Storm | G06F 3/0346 |

* cited by examiner

*Primary Examiner* — Vance M Little
(74) *Attorney, Agent, or Firm* — Charles B. Lobsenz; Brian H. Buck; Potomac Law Group, PLLC

(57) ABSTRACT

A system and methodology is provided in which image and video injection attack attempts, which may occur in connection with document or individual verification processes, can be detected and handled. The system and methodology of the present invention, in some embodiments, employs functionalities such as haptic vibration generation and accelerometer data typically present in existing user devices to implement attack detection and response.

16 Claims, 4 Drawing Sheets

DETECTION OF IMAGE INJECTION ATTACKS IN MOBILE DOCUMENT CAPTURE SYSTEMS USING ACCELEROMETER-BASED VIBRATION ANALYSIS

FIELD OF THE DISCLOSURE

Disclosed embodiments relate generally to systems and methodologies associated with document verification conducted remotely and more specifically to solutions directed to detecting and preventing image injection attacks associated therewith.

BACKGROUND

The conduct of online financial transactions and other online transactions where identity verification is critical, or at least desirable, is commonplace. When individuals seek to execute online transactions where money, reputation, information access and/or other matters of a sensitive nature are at stake, it is typically required that, prior to permitting the transaction to proceed, the identity of the individual seeking to execute the transaction is verified to confirm that the person is who they say they are. There are numerous regulatory requirements dictating the level and type of verification required but it is also important to verify identity in many types of transactions to ensure that fraudulent conduct is prevented to the extent possible even where regulatory control does not exist.

There are many different techniques for performing identity verification in an online environment including implementations requiring the input of user ids and passwords, two factor authentication techniques, biometric authentication as well as many others. In some cases, identity verification is accomplished through the requirement for the user to present an identification document such as a driver's license, passport, social security card or other document. The process may also or alternatively require the user to take a selfie and/or live video as part of the identify verification process. Identity verification solutions such as these are typically used in connection with various digital onboarding processes and/or KYC (know your customer) processes.

Unfortunately, even these processes suffer from drawbacks in that they are subject to fraudulent actions which can result in a positive identity verification even when the user isn't who they say they are. A common attack vector exploited by fraudsters involves bypassing live capture by injecting pre-recorded images or videos into the capture SDK, typically by hijacking the camera input source. Since the capture SDK lacks a native mechanism to verify the provenance of the image stream, it is vulnerable to such injection attacks. These attacks are referred to as video injection attacks. In this case, a fraudster injects pre-recorded or manipulated video streams into the verification process in an attempt to mimic live user interaction which typically occur in connection with liveness activities.

In this case, a fraudster might inject a pre-recorded video showing a person holding an identity document or moving their face. The video is typically routed to the application or the verification API in place of what should be a real time video stream. These videos may be produced so as to simulate required liveness actions such as blinking, turning the head and/or speaking. Video injection attacks may be implemented via streaming through virtual cameras or software emulators.

Another class of attacks is referred to as image injection attacks. In the cases of image injection attacks, a fraudster may bypass the device's camera feed and directly submit a manipulated or pre-captured image of a document or a selfie capture. The image could be, for example, a forged identity document, a screen displaying a photograph (e.g. showing a digital image of an identity document in lieu of a physical one, and/or a high resolution photo of another person used in place of a selfie in order to spoof facial recognition protocols.

Fraudsters may implement image injection attacks via API tampering to upload images in place of a live camera feed or they might display images on screens and capture them as if they were a live image. In addition, they may use high quality printed images or deep fakes instead of displaying a document or face in real time for the camera as intended.

Based on the above and as will be understood, there is a need for a system and methodology in which the drawbacks of existing solutions, which sometimes permit false identity verifications, can be minimized or eliminated. It is desirable to provide a solution for identity verification using existing user operated devices such as smartphones but wherein the solution is not readily susceptible to image or video injection attacks.

SUMMARY OF THE INVENTION

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system which provides remote identity verification used in connection with proposed online transactions and other limited-access online operations and where the susceptibility to image and video injection attacks is eliminated or at least minimized.

According to the teachings herein, the disclosed method and system can detect and respond to image and video injection attempts in connection with identity verification processes. The system and methodology of the present invention, in some embodiments, employs functionalities typically present in existing user devices to implement attack detection and response.

In some embodiments, the system of the present invention initiates a signal which is transmitted to the user device at one or more times during the identity verification process. This signal causes the user device to vibrate, typically via existing haptic capabilities available in these user devices. Once the signal is sent, and vibration occurs, a vibration analysis is performed using accelerometer data obtained from the user device in response to the vibration. Because the results of the vibration analysis will vary based upon the positioning of the device, the system of the present invention is able to make an assessment as to the positioning of the device at the time the signal is sent. Typically, when injection attacks occur, they are implemented via an API such that the fraudster will not be holding the device in his or her hand. Instead, it is likely that the device will be positioned on a surface of some kind.

According to the teachings of the present invention, in some embodiments thereof, the vibration analysis is used to determine whether the device is being held or not. In the latter case, the system determines that it is more likely than not that an injection attack is being attempted. When this determination is made, the system of the present invention may report a failed identity verification. Alternatively, the system of the present invention may require further, additional steps in the verification process due to the likelihood that an attack is being attempted.

In some embodiments of the present invention, a stand alone subsystem may be implemented for the purpose of identifying and handling image and video injection attacks. Alternatively, in other embodiments of the present invention, the functionality for detecting and handling image and video injection attacks may be a component of a broader system such as a document verification solution, identity verification solution, fraud detection solution and/or other systems where it is desirable to minimize threats to liveness verification techniques and methodologies.

The system and methodology of the present invention, in some embodiments, may implement these techniques and methodologies in a way that is very effective in thwarting fraudulent identity verification attempts such as when photos are used in place of selfies and/or when short, pre-made videos are used in place of an actual, live person during the verification process.

DETAILED DESCRIPTION OF THE INVENTION

Figure 1:
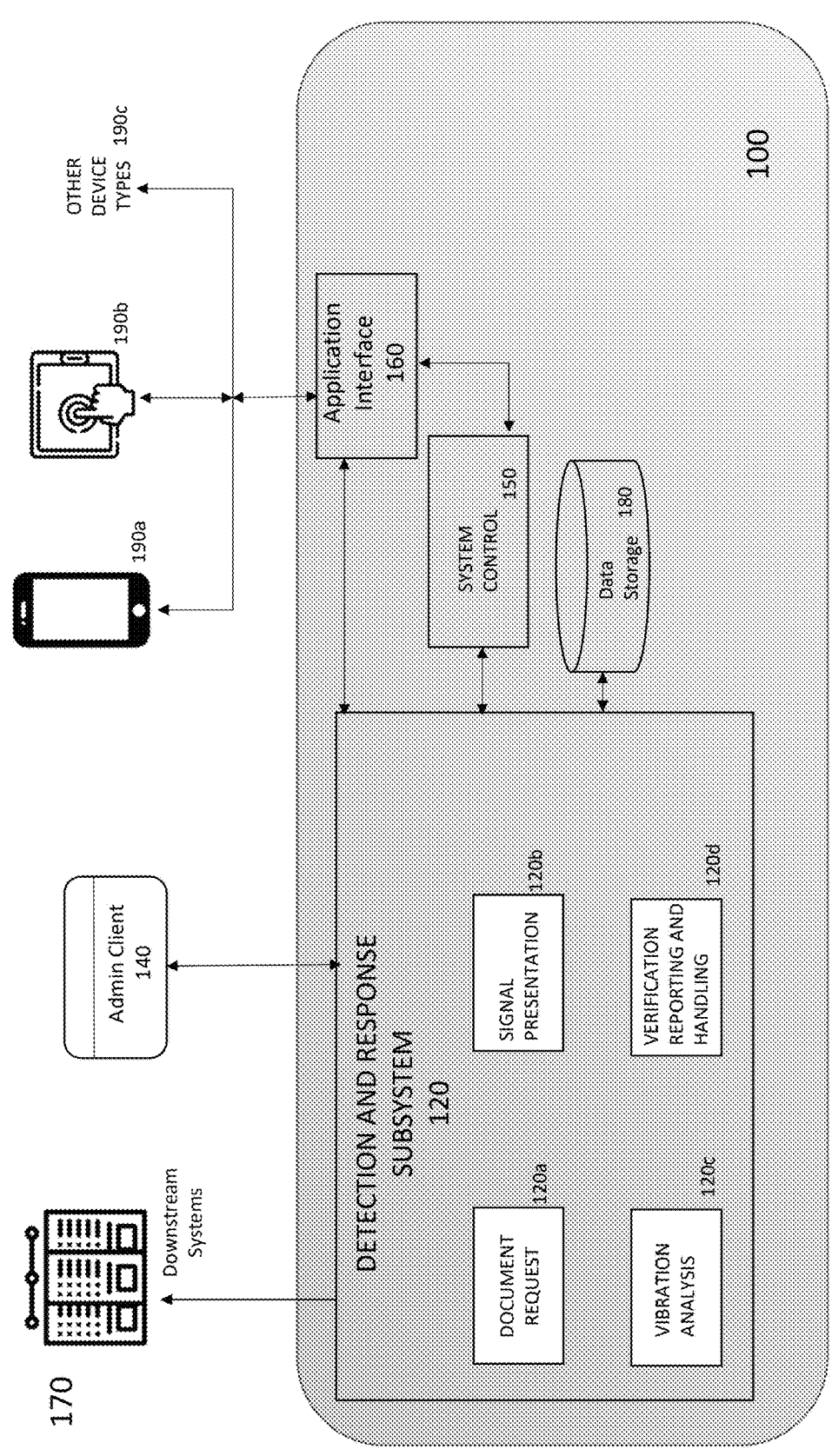
FIG. 1 is a diagram depicting the major components of the system of the present invention, including various elements with which the system of the present invention may interact, in some embodiments thereof.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Aspects of the present disclosure are directed to a system and methodology for detecting and handling image and video injection attacks in connection with liveness solutions for identity verification, document verification, fraud detection and other related solutions. The system and methodology of the present invention, in some embodiments, employs haptic feedback in connection with accelerometer readings in response to haptic feedback in order to make determinations as to the likelihood of an injection attack occurring. According to the teachings of the present invention, the variance in accelerometer readings in response to the initiation of a haptic vibration is used as a predictor of the likelihood of an injection attack being underway. The resultant assessment can be used alone to determine a course of action as to verification or, alternatively, the teachings of the present invention can be used in combination with other techniques such as facial recognition and other methodologies to determine if the person is both live and likely to be who they say they are.

Referring now to FIG. 1, there is illustrated an Image and Video Injection Attack System (IVIAS) 100 according to one or more embodiments herein. IVIAS 100 may reside on a single cloud based server although it is also possible for various components of IVIAS 100 (as described herein) to reside on separate servers. By way of example, IVIAS 100 may be a computer implemented application which resides on a computing server. As will be apparent from the discussion herein, IVIAS 100 may include and/or implement all appropriate software and/or hardware for carrying out its image and video attack detection functionalities and related capabilities. Operation of IVIAS 100 is under the control of system control 150.

IVIAS 100 preferably includes Detection and Response Subsystem (DRS) 120, which itself is comprised of a number of modules as discussed further herein. DRS 120 operates to assess and respond to a potential image or video injection spoofing attack in connection with mobile document and/or selfie capture as a component of an identity verification process. The teachings herein provide a novel system and methodology which enables the detection of image and video injection attacks during mobile document capture by analyzing accelerometer signals in response to an SDK-triggered phone vibration. Detection is accomplished by distinguishing between handheld and stationary devices based on vibration damping patterns as more fully discussed below.

Implementations, according to various embodiments of the present invention, cause a vibration signal to be sent to a user device 190 in connection with an identity verification process. Vibration analysis is performed with respect to the resulting vibration and then an assessment is made as to the likelihood of an injection attack occurring as more fully described herein. User devices 190 may comprise one or more of any known device through which a user may provide input and see outputs on a screen. In preferred embodiments, user device 190 include a camera function which provides single image captures as well as multi-image captures and video capture. Examples of user devices 190 may include, without limitation, smartphones, tablets, desktop and laptop computers, gaming consoles and the like. In some embodiments, user devices 190 are capable of implementing SDKs and related locally resident applications. Further, according to the teachings of the present invention, user devices 190 may include the ability to produce vibrations on command (e.g. haptic capability) and also include an accelerometer functionality which provides data with respect to movement of the device in real time.

The communication link between user devices 190 and IVIAS 100 may be via a wireless protocol such as via a cellular network and/or a Wi-Fi network or other wireless protocol. A wired communication link is also possible. User devices 190a, 190b and 190c may communicate with IVIAS 100 via application interface 160. Application interface 160 may comprise one or more application programming interfaces (APIs) that permit applications associated with user devices 190 to communicate with IVIAS 100.

IVIAS 100 may be accessed, in some embodiments, by an administrative client 140 for the purpose of administrating the operation of the IVIAS 100 including how and when parameters are set including the selection, timing and combination of signals presented to users as well as thresholds for verification, handling protocols for potential threats when detected and specifics regarding vibrations and the analysis thereof. Administrative client 140 may also be used to control various other operational aspects associated with injection attack detection and response. Admin client 140 may comprise a personal computer, a laptop, a handheld computing device such as a smartphone or a tablet or any other similar device.

IVIAS 100 may reside on one or more physical servers. These servers may include data storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to IVIAS 100.

Data storage 180 associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Data storage 180 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Data storage 180 may store software algorithms, information determined by processors, images, videos, information received from servers, information received from devices 190 and admin client 140 as well as other data which is used to make injection attack assessments and how to respond thereto.

While an exemplary architecture is described above, it will readily be understood by one of skill in the art, that an unlimited number of architectures and computing environments are possible while still remaining within the scope and spirit of the present embodiments.

Returning now FIG. 1 and to the specific components of IVIAS 100, IVIAS 100 may comprise Detection and Response Subsystem (DRS) 120 which may communicate with any or all of data storage 180, admin client 140, application interface 160 and downstream systems 170 under the control of system control 150. DRS 120 also communicates with user devices 190, as required, via application interface 160.

DRS 120 includes various components which are described hereinbelow. Operation(s) of each of these components will be described at a high level now and then in further detail later in the present disclosure. In connection with a process for identity verification using a document and/or a selfie, document request module 120a functions to initiate a request to the user via user device for the user to either take a selfie or a video or both. The request may require presentation of a document, a photo, a live view of the person's face or any other requirement for something to be photographed or shown via a live video stream. Document request module 120a, as part of the request, the camera functionality in user device 190 may be activated to capture video and/or a still frame image. Specific timing of and number of requests for documents, selfies, videos, etc. initiated by document request module 120a may be configured by an administrator via admin client 140 or these parameters may be determined automatically via artificial intelligence, machine learning or some other automated schema for determining a preferred number of requests and the times at which such requests are made.

It will be noted that the signals and interaction between DRS 120 and user device 190 are, in some embodiments, managed by one or both of application interface 160 resident on IVIAS 100 and/or one or more SDKs resident on user device 190.

In connection with the image and/or video capture request initiated by document request module 120a, signal presentation module 120b will, at one or more points during the image or video capture, initiate a signal to user device 190 which causes the haptic or other vibration generating component within user device 190 to cause a vibration to occur on user device 190. In some embodiments, haptic elements which cause vibrations are present in user devices for accessibility and other purposes.

In some embodiments of the present invention, the user device's management of the responses to and interaction with IVIAS 100 are controlled by an application resident on user device 190 for the purpose of detecting and handling injection attacks. In other embodiments, this application may have broader functionality possibly also including identity verification and/or fraud detection capabilities. In alternative embodiments, rather than a resident application on user device 190, the image injection detection and handling capabilities may be managed via a software as a service application accessed via a web browser on user device 190. However, in these embodiments, it is necessary for the application to provide necessary permissions to initiate vibrations and access the accelerometer on user device 190.

Specific timing of and number of vibrations initiated by signal presentation module 120b (and thus, the number of vibration analyses performed, as discussed below) may be configured by an administrator via admin client 140 or these parameters may be determined automatically via artificial intelligence, machine learning or some other automated schema for determining a preferred number of requests and the times at which such requests are made.

Vibration analysis module 120c of DRS 120 operates to analyze movement of user device 190 through the use of resident accelerometer functionality in response to the vibration generated following the signal from signal presentation module 120b. More details regarding the conduct of the vibration analysis under the control of vibration analysis module 120c are provided below.

Finally, verification reporting and handling module 120d of DRS 120, operates to manage the reporting of any detected potential injection attacks as well as manage the process for handling any such potential attacks. For example, reporting may be made to one or more downstream systems 170 along with proposed handling recommendations. Similarly, verification reporting and handling module 120d may also operate to control processes internal to DRS 120 based on vibration analysis assessment. For example, if a specific threshold resulting from vibration analysis is reached and that threshold is indicative of a specific potential for a possible injection attack, verification reporting and handling module 120d may cause document request module 120a to initiate additional or different document requests to further assess likelihood of an ongoing attack. Similarly, if a specific threshold resulting from vibration analysis is reached and that threshold is indicative of a specific potential for a possible injection attack, verification reporting and handling module 120d may cause signal presentation module 120b to initiate additional or different vibrations at the user device 190 to further assess likelihood of an ongoing attack.

Figure 2:
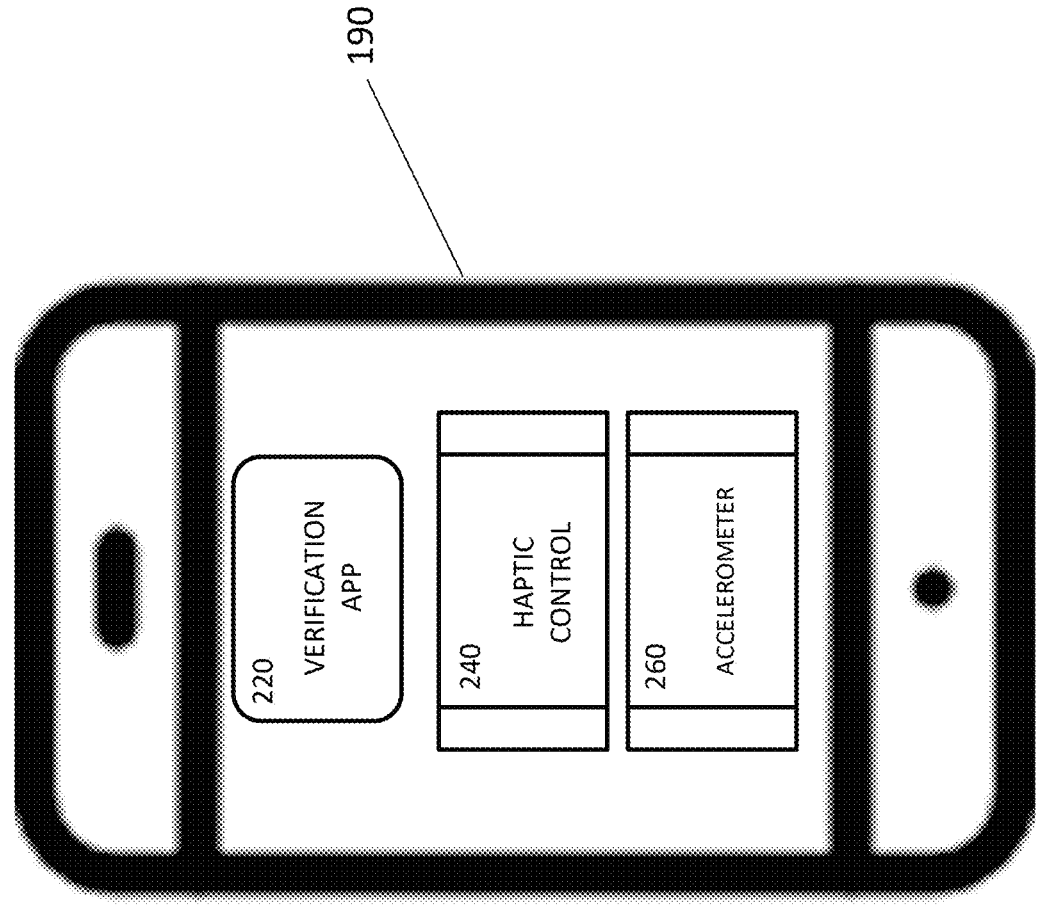
FIG. 2 is an illustration of an exemplary user device along with the key components located thereon and which are used in connection with injection attack prevention according to the teachings of the present invention.

Turning now to FIG. 2 and in connection therewith, a more detailed discussion of an exemplary user device 190 along with the key components located thereon is provided. These components are used in connection with injection attack detection, prevention and handling according to the teachings of the present invention in some embodiments. User device 190, in some embodiments, may be a smartphone, a tablet or some other handheld device that has both camera (still or video, or both) capability and haptic capability. In some embodiments, user device 190 provides adequate permissions to allow IVIAS 100 some measure of control over and access to vibration generation, camera initiation and accelerometer data available on the device. Examples of user devices 190 may include iOS smartphones, android based smartphones, iPads and other tablets as well as other devices with the capabilities described above.

In some embodiments, user device 190 as shown in FIG. 2 may be a smartphone including a camera capable of taking still and video images, having an accelerometer and also having the ability to generate vibrations of one or more frequencies, one or more intervals and/or one or more levels of vibration. In addition, user device 190 may also be configured to allow individual users to set some of these parameters. However, in preferred embodiments, it is desirable that IVIAS 100 have the ability to generate vibrations with specific frequencies, levels and intervals such that the desired vibrations may be generated and expected responses analyzed as described herein.

Verification App 220 may be resident on user device 190. This application may be solely for the purpose of detecting and handling image injection attacks in connection with identity verification, fraud detection and similar processes or this application may include broader capabilities such as including identity verification functionality generally. As noted above, in lieu of verification app 220 control of the processes of the present invention on user device 190 may be implemented via a software as a service functionality via a web browser if sufficient permissions exist.

Haptic control 240 receives signals from DRS 120 which causes the physical haptic response element to generate a vibration on user device 190. In some embodiments, haptic control 240 operates to provide varied vibration parameters such as duration, frequency, amplitude and the like. In this case and in some embodiments, the signal received from signal presentation module 120b indicates the desired parameters for the vibration to be generated.

Finally, user device 190 may also include accelerometer function which measures device movement and makes available data associated with recent movements of user device 190. In some embodiments, vibration analysis module 120c of DRS 120 receives accelerometer data from accelerometer 260 which is, in turn, used to perform vibration analysis. More details on the aspects of vibration analysis according to the teachings of the present invention is provided below.

Figure 3:
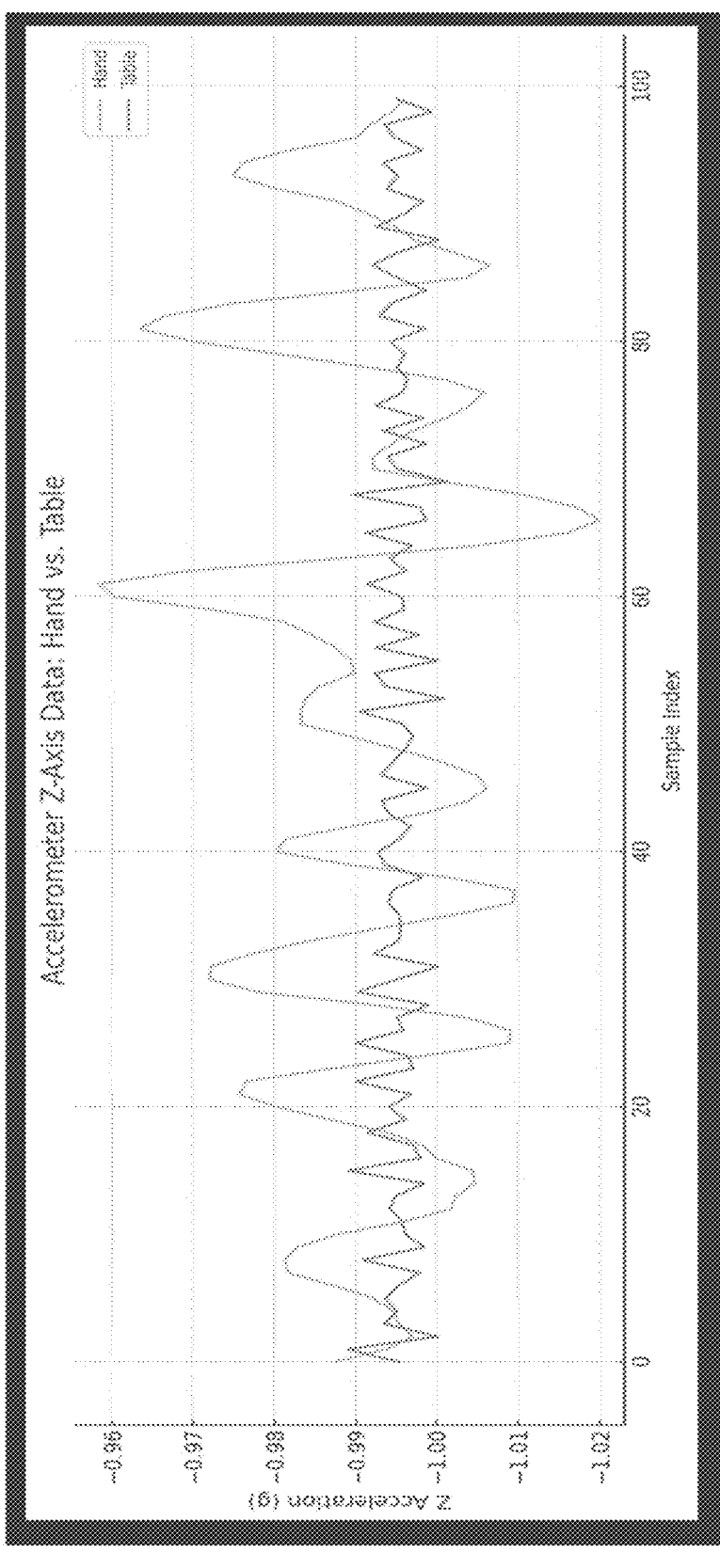
FIG. 3 is a graph illustrating vibration analysis data as between a device being handheld and resting on a surface according to the teachings of the present invention.

With reference now to FIG. 3 more detail as to the vibration analysis of the present invention is provided. As noted above, in some embodiments, various parameters dictating the nature of the vibration can be determined by DRS 120. Further, accelerometer 260 provides data to DRS 120 regarding device movement in response to recent vibrations such that vibration analysis can be performed.

As noted above, it is expected that some vibration analysis results will be indicative of the user device 190 being held in the hand of the user while other results will be indicative of user device laying flat on a surface. In this later case, it is assumed that it is more likely that an injection attack may be occurring because rather than holding the device in his or her hand, the user is more likely to be replacing the live camera data stream with an injected video or image coming from a computing device so that it is not necessary to hold the user device in the user's hand.

In some embodiments only z-axis accelerometer data is captured and used for vibration analysis. In other embodiments other or different accelerometer data may be used to perform vibration analysis according to the teachings of the present invention. Z-axis data is the device's front-to-back axis which is a good choice for determining likely placement (hand vs resting on a surface) of the device 190. In most cases z-axis data is freely available to DRS 120 without additional permissioning being required from the user or otherwise. In some embodiments, z-axis data is sampled at 100 samples per second which is generally available with most user devices 190. In some embodiments, the most recent 100 z-axis data samples are saved along with other data available in a metrics file and this data is used by vibration analysis module 120c of DRS 120 to perform vibration analysis.

In some embodiments, the metrics file contains the raw meta information concerning the capture session, including, for example, the coordinates of the document edge and/or variance in the lighting of the capture. The metrics file thus may contain various analytics of the session as the user does the document and selfie capture. Therefore the signals associated with the frequency of the vibrations are sent along with other meta information of the capture session to the server for further processing.

Testing and observations with respect to the variance in signals between a hand held device and a device located on a fixed surface shows a clear difference as shown in FIG. 3. As can be seen, when the user device 190 is hand held, the vibration signal has a lower frequency with a higher amplitude. This is consistent with human hands being generally softer than a hard surface on which a user device may rest. In contrast, a user device 190 resting on a hard surface such as a table generates a vibration response with a higher frequency and a lower amplitude because rigid surfaces do not absorb vibration the way a human hand docs.

In some embodiments, the frequency of the haptic feedback is approximately 200 Hz or higher, which is too fast to be accurately captured by an accelerometer sampling at 100 Hz. In some implementations, the haptic feedback acts as a trigger and provides some variability to the signal.

Figure 4:
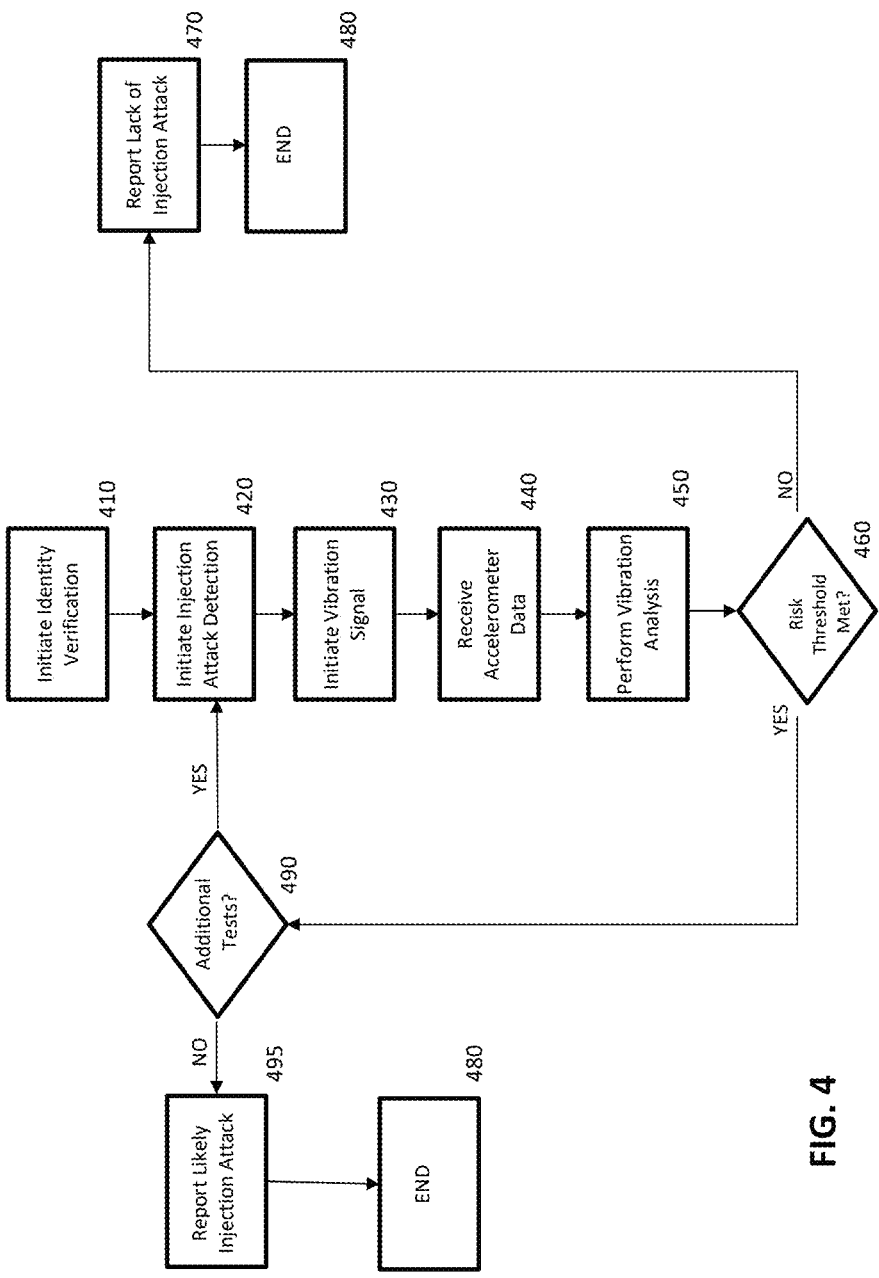
FIG. 4 is a flowchart illustrating the major steps implemented by the system of the present invention using injection attack prevention methodologies in connection with identity verification, in some embodiments thereof.

With reference now to FIG. 4, a flowchart illustrating the overall process of the present invention, in one embodiment, is provided. At step 410, an identity verification process is initiated. This may involve a selfie, verification of a document or some other requirement in connection with an identity verification or fraud detection operation. Next, at step 420, the image or video injection attack detection process is initiated. This may occur at one or more times during the identity verification or fraud detection process. As part of the attack detection process, and at step 430, IVIAS 100 initiates a vibration signal on the user device 190 which is typically implemented via the haptic functionality on user device 190. Next, at step 440, accelerometer data, which shows the user device 190 movement in response to the vibration signal, is received by IVIAS 100.

Based on the generated signal parameters, the accelerometer data and other metrics as described above, IVIAS 100 performs a vibration signal analysis at step 450. In connection with this analysis, IVIAS 100 next assesses whether a minimum risk threshold indicative of a potential attack has been met at step 460. This risk threshold may take the form of a minimum or maximum signal amplitude, a minimum or maximum signal frequency, some combination thereof and/ or some other parameter(s) exceeding or being below pre-determined thresholds.

If the risk threshold has not been met, it is assumed that there is no attempted attack. This may be reported to one or more downstream systems 170 at step 470 and the process then terminates at step 480. Alternatively, if the risk threshold has been met at step 460, then the process proceeds to step 490. At this step, the system uses pre-determined configuration data to determine whether additional testing (e.g. more vibration signals and more analysis) should be undertaken in which case the process proceeds to step 420 or, alternatively, if testing should be deemed complete. In the latter case, the process proceeds to step 495 where a likely attack may be reported to one or more downstream systems 170 and the identity verification process may be terminated as a failed verification.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A system configured to detect and report attempted injection attacks in connection with verification operations implemented via a user device of a user, the system comprising:

one or more processors configured to execute computer program modules comprising a processor and a physical storage capability;

a signal presentation computer program module operative to present at least a first signal, corresponding to a first verification operation, of said verification operations, to said user device, said at least one signal comprising a command to cause a first vibration upon said user device;

a vibration analysis computer program module operative to analyze a physical response at said user device as a result of said first vibration and generate, for said first verification operation, of said verification operations, a first vibration analysis result based at least on corresponding first z-axis accelerometer data of said user device and that indicates whether said user device is (a) handheld by said user or (b) away from a hand of said user; and a handling and reporting computer program module operative to respond to said first vibration analysis result by causing said signal presentation computer module to present at least a second signal, corresponding to a second verification operation, of said verification operations, to said user device, said at least a second signal comprising a command to cause a second vibration upon said user device, and said vibration analysis computer program module being operative to analyze a physical response at said user device as a result of said at least a second signal and generate, for said second verification operation, of said verification operations, a second vibration analysis result based at least on corresponding second z-axis accelerometer data of said user device and that indicates whether said user device is (c) handheld by said user or (d) away from said hand of said user;

wherein, if said first and second vibration analysis results are indicative of an attempted injection attack, said handling and reporting computer program module reports an attempted injection attack as likely.

2. The system of claim 1 wherein said handling and reporting computer program module is operative to report attempted injection attacks to one or more downstream systems.

3. The system of claim 1 wherein said attempted injection attack comprises an attempted video injection attack.

4. The system of claim 1 wherein said attempted injection attack comprises an attempted image injection attack.

5. The system of claim 1 wherein said first and second vibration analysis results are viewed as a likely attempted injection attack if said first and second vibration analysis results are indicative of said user device being located on a flat surface and not handheld.

6. The system of claim 1 wherein said first and second vibration analysis results are viewed as unlikely to be an attempted injection attack if said first and second vibration analysis results are indicative of said user device being located in said hand of said user.

7. The system of claim 1 wherein said detection and reporting of attempted injection attacks is a component of an identity verification system.

8. The system of claim 1 wherein said user device comprises a smartphone.

9. A computer-implemented method for detecting and reporting attempted injection attacks in connection with verification operations implemented via a user device of a user, the method being implemented in a computer system comprising one or more processors configured to execute computer program modules, the method comprising the steps of:

presenting at least a first signal to said user device, said at least a first signal, corresponding to a first verification operation, of said verification operations, comprising a command to cause a first vibration upon said user device;

analyzing a physical response at said user device as a result of said first vibration and generating a first vibration analysis result based at least on corresponding first z-axis accelerometer data of said user device and that indicates whether said user device is (a) handheld by said user or (b) away from a hand of said user; and responding to said first vibration analysis result by (c) presenting at least a second signal corresponding to a second verification operation of said verification operations, to said user device, said at least a second signal comprising a command to cause a second vibration upon said user device, (d) analyzing a physical response at said user device as a result of said at least a second signal and (e) generating, for said second verification operation, of said verification operations, a second vibration analysis result based at least on corresponding second z-axis accelerometer data of said user device and that indicates whether said user device is (i) handheld by said user or (ii) away from said hand of said user, wherein, if said first and second vibration analysis results are indicative of an attempted injection attack, reporting that an attempted injection attack as likely.

10. The method of claim 9 further comprising the step of reporting attempted injection attacks to one or more downstream systems.

11. The method of claim 9 wherein said attempted injection attack comprises an attempted video injection attack.

12. The method of claim 9 wherein said attempted injection attack comprises an attempted image injection attack.

13. The method of claim 9 wherein said first and second vibration analysis results are viewed as a likely attempted injection attack if said first and second vibration analysis results are indicative of said user device being located on a flat surface and not handheld.

14. The method of claim 9 wherein said first and second vibration analysis results are viewed as unlikely to be an attempted injection attack if said first and second vibration analysis results are indicative of said user device being located in a human hand.

15. The method of claim 9 wherein said detection and reporting of attempted injection attacks is a component of an identity verification system.

16. The method of claim 9 wherein said user device comprises a smartphone.

* * * * *